(12) United States Patent
Nobuta et al.

(10) Patent No.: US 8,940,191 B2
(45) Date of Patent: Jan. 27, 2015

(54) ELECTROCONDUCTIVE POLYMER SOLUTION, ELECTROCONDUCTIVE POLYMER COMPOSITION, AND SOLID ELECTROLYTIC CAPACITOR THEREWITH AND METHOD FOR PRODUCING SAME

(71) Applicant: NEC TOKIN Corporation, Sendai-shi, Miyagi (JP)

(72) Inventors: Tomoki Nobuta, Sendai (JP); Yasuhisa Sugawara, Sendai (JP); Satoshi Suzuki, Sendai (JP); Yasuhiro Tomioka, Sendai (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 13/779,199

(22) Filed: Feb. 27, 2013

(65) Prior Publication Data
US 2013/0236636 A1 Sep. 12, 2013

(30) Foreign Application Priority Data

Mar. 7, 2012 (JP) ................. 2012-050127

(51) Int. Cl.
*H01B 1/00* (2006.01)
*B05D 5/12* (2006.01)
*C08G 75/00* (2006.01)
*C08G 73/00* (2006.01)
*C08G 73/06* (2006.01)
*H01G 9/025* (2006.01)
*H01B 1/12* (2006.01)
(Continued)

(52) U.S. Cl.
CPC ............... *H01G 9/025* (2013.01); *H01B 1/124* (2013.01); *H01G 9/0036* (2013.01); *H01G 9/028* (2013.01); *H01G 11/48* (2013.01); *H01G 11/56* (2013.01); *H01G 9/15* (2013.01); *Y02E 60/13* (2013.01)

USPC ............ 252/500; 252/62.2; 427/80; 528/377; 528/422; 528/423

(58) Field of Classification Search
None
See application file for complete search history.

(56) References Cited

U.S. PATENT DOCUMENTS

2009/0021894 A1  1/2009  Ning et al.
2011/0080690 A1* 4/2011  Ning et al. .................... 361/525
(Continued)

FOREIGN PATENT DOCUMENTS

JP  2006-249128 A  9/2006
JP  2006-287182 A  10/2006
(Continued)

OTHER PUBLICATIONS

Office Action dated Sep. 6, 2012 in related Japanese Application No. 2012-050127 with partial English-language translation (5 pgs.).

*Primary Examiner* — Harold Pyon
*Assistant Examiner* — Jaison Thomas
(74) *Attorney, Agent, or Firm* — Foley & Lardner LLP (57) ABSTRACT

The present invention provides an electroconductive polymer solution in which the good dispersibility is maintained and the pH is arbitrarily adjusted, and an electroconductive polymer composition having an excellent heat resistance. Further, the present invention provides a solid electrolytic capacitor having an excellent reliability.

The present invention is an electroconductive polymer solution, containing an electroconductive polymer in which a dopant is doped, a first compound having an amino group and a hydroxyl group, a second compound having a carboxylic acid group, and a dispersing medium.

13 Claims, 4 Drawing Sheets

(51) Int. Cl.
*H01G 9/00* (2006.01)
*H01G 9/028* (2006.01)
*H01G 11/48* (2013.01)
*H01G 11/56* (2013.01)
*H01G 9/15* (2006.01)

(56) References Cited

U.S. PATENT DOCUMENTS

2011/0080691 A1* 4/2011 Ning et al. .................. 361/525
2013/0258554 A1* 10/2013 Ode et al. .................... 361/524

FOREIGN PATENT DOCUMENTS

| JP | 2007027767 A | 2/2007 | | |
|----|---|---|---|---|
| JP | 2011-082314 A | 4/2011 | | |
| WO | WO2006/025262 A1 | 3/2006 | | |
| WO | WO 2007/091656 A1 | 8/2007 | | |
| WO | WO 2011/115011 | * | 9/2011 | ............. H01G 9/028 |
| WO | WO2011/115011 A1 | | 9/2011 | |

* cited by examiner

ELECTROCONDUCTIVE POLYMER SOLUTION, ELECTROCONDUCTIVE POLYMER COMPOSITION, AND SOLID ELECTROLYTIC CAPACITOR THEREWITH AND METHOD FOR PRODUCING SAME

This application is based upon and claims the benefit of priority from Japanese patent application No. 2012-50127, filed on Mar. 7, 2012, the disclosure of which is incorporated herein in its entirety by reference.

BACKGROUND OF THE INVENTION

1. Field of the Invention

The present invention relates to an electroconductive polymer solution, an electroconductive polymer composition, and a solid electrolytic capacitor therewith and a method for producing the same.

2. Description of the Related Art

Solid electrolytic capacitors, which are obtained by forming a dielectric oxide film on a porous body of a valve metal such as tantalum or aluminum by anodic oxidation method and thereafter by forming an electroconductive polymer on this oxide film to be a solid electrolyte, are developed.

These solid electrolytic capacitors have an equivalent series resistance (hereinafter, referred to as ESR) lower than that of a capacitor in which the solid electrolyte is manganese dioxide conventionally used, and they are used for various purposes. Recently, solid electrolytic capacitors having a low ESR, a large capacity, and a small loss are required with a trend of high frequency and high current of an integrated circuit.

The methods for forming an electroconductive polymer layer that comes to be a solid electrolyte of this solid electrolytic capacitor are roughly classified into chemical oxidative polymerization and electrolytic oxidative polymerization. As the monomer constituting an electroconductive polymer material, pyrrole, thiophene, 3,4-ethylenedioxythiophene, aniline and the like are known. Also, recently, there is a method in which an electroconductive polymer solution is applied to form a solid electrolyte.

The electroconductive polymer solution is generally provided as a dispersion or a solution in an aqueous solvent or as a solution in an organic solvent, and the solvent is removed at the time of use to be used as an electroconductive polymer material. It is variously studied as antistatic materials, electromagnetic shield materials, electrodes of capacitors, electrochemical capacitors and the like, electrodes of dye-sensitization solar cells, organic thin film solar cells and the like, and electrodes of electroluminescence displays. Recently, in order to provide an electroconductive polymer material having a higher performance, the developments regarding a method for producing an electroconductive polymer solution and regarding a composition, for example, in which an additive is added to provide a new function, is actively carried out.

As a technology regarding the electroconductive polymer solution, technologies, in which the hydrogen ion index (pH) of the electroconductive polymer solution is arbitrarily adjusted when the electrode is produced in consideration of the inherent acid resistance of the electrode and the jointing material, are disclosed as follows.

JP 2006-249128 A relates to a technology to provide an electroconductive polymer solution and an electroconductive paint film in which the corrosion of the metal and the discoloration of the contact material can be prevented, and discloses a technology regarding an electroconductive polymer solution which contains a 7-conjugated electroconductive polymer, a polyanion and a solvent and in which the pH is adjusted to 5 to 13.

JP 2006-287182 A relates to a technology to provide a capacitor and a method for producing the same in which the corrosion of the dielectric layer is prevented, and discloses a technology regarding a capacitor in which the solid electrolyte of the capacitor contains a π-conjugated electroconductive polymer, a polyanion and a solvent and which is formed by applying an electroconductive polymer solution in which the pH is adjusted to 3 to 13.

JP 2011-82314 A relates to a technology to provide a solid electrolytic capacitor in which the high capacity and the low ESR are maintained as well as in which the heat resistance is high, and discloses a technology regarding a solution for a solid electrolytic capacitor which contains at least water and/or water and a mixed solvent, an electroconductive complex of a cationized electroconductive polymer and a polymer anion, and a hydroxy compound with a melting point of 170° C. or higher, in which the hydrogen ion index of the solution is adjusted to a range of pH 3 to 13.

As for the method for adjusting the pH of the electroconductive polymer solutions of JP 2006-249128 A, JP 2006-287182 A and JP 2011-82314 A, a method by mixing an alkali, an amine, an imidazole, a pyridine or the like in the solution of the complex of the 7-conjugated electroconductive polymer and the polyanion to form a salt, a method of esterifying the acid group, a method by amidating the acid group or the like is carried out.

WO 2007/091656 relates to a technology to provide a capacitor in which the electroconductivity of the solid electrolyte layer is excellent, the ESR is low, and the heat resistance and the voltage resistance are also high, and discloses a technology regarding a capacitor in which the solid electrolyte of the capacitor contains a π-conjugated electroconductive polymer, a polyanion and an amide compound, and which is produced by applying an electroconductive polymer containing a π-conjugated electroconductive polymer, a polyanion, an amide compound and a solvent to a solid electrolyte.

However, although the pH of the electroconductive polymer solution can arbitrarily be adjusted by these methods, on the other hand, the property and the heat resistance of the electroconductive polymer film is not always sufficient in the electroconductive polymer composition obtained from this electroconductive polymer solution, resulting that there remains a problem.

The present invention has been realized to solve the above-mentioned problem. The object thereof is to provide an electroconductive polymer solution in which the good dispersibility of the electroconductive polymer solution is maintained and the pH is arbitrarily adjusted, to provide an electroconductive polymer composition having an excellent heat resistance, and also to provide a solid electrolytic capacitor having an excellent reliability and a method for producing the same.

SUMMARY OF THE INVENTION

According to the present invention, there is obtained an electroconductive polymer solution containing an electroconductive polymer in which a dopant is doped, a first compound having an amino group and a hydroxyl group, a second compound having a carboxylic acid group, and a dispersing medium.

Also, in the electroconductive polymer solution of the present invention, the first compound is preferably an aminopropanediol.

Also, in the electroconductive polymer solution of the present invention, the aminopropanediol is preferably at least one kind selected from 2-amino-2-hydroxymethyl-1,3-propanediol, 2-amino-2-hydroxyethyl-1,3-propanediol, 3-dimethylamino-1,2-propanediol, 3-methylamino-1,2-propanediol and 1-(methylamino)propanediol.

Also, in the electroconductive polymer solution of the present invention, the second compound may be a water-soluble compound with a low molecular weight.

Also, in the electroconductive polymer solution of the present invention, the second compound may be a water-soluble polymer.

Also, in the electroconductive polymer solution of the present invention, the number ratio of the amino group included in the first compound and of the carboxylic acid group included in the second compound is preferably in a range of 1.0:2.0 to 5.5.

Also, in the electroconductive polymer solution of the present invention, the electroconductive polymer preferably includes at least one kind selected from the group consisting of polypyrroles, polythiophenes, polyanilines and derivatives thereof.

Also, in the electroconductive polymer solution of the present invention, the electroconductive polymer preferably contains a repeating unit of 3,4-ethylenedioxythiophene or a derivative thereof.

Also, the electroconductive polymer solution of the present invention preferably has a pH of 2.5 to 7.0.

Also, according to the present invention, there is obtained an electroconductive polymer composition, containing the electroconductive polymer and a compound having a carboxylic acid amide bond and a carboxylic acid ester bond which is formed from the first compound and the second compound by removing the dispersing medium from the above-mentioned electroconductive polymer solution.

Also, in the electroconductive polymer composition of the present invention, the electroconductive polymer solution is preferably heated at 80° C. or higher and 300° C. or lower to remove the dispersing medium.

Also, according to the present invention, there is obtained an electroconductive polymer composition by forming a compound having a carboxylic acid amide bond and a carboxylic acid ester bond from a first compound having an amino group and a hydroxyl group and a second compound having a carboxylic acid group, wherein the compound having a carboxylic acid amide bond and a carboxylic acid ester bond is laid in an electroconductive polymer matrix or between electroconductive polymer dispersing particles.

Also, according to the present invention, there is obtained a solid electrolytic capacitor, having a solid electrolyte containing the above-mentioned electroconductive polymer composition.

Also, according to the present invention, there is obtained a method for producing a solid electrolytic capacitor, including forming a dielectric layer on a surface of an anode conductor containing a valve metal, and carrying out an application or an impregnation of the above-mentioned electroconductive polymer solution on the dielectric layer to form a solid electrolyte layer containing an electroconductive polymer composition obtained by removing the dispersing medium from the electroconductive polymer solution.

Also, according to the present invention, there is obtained a method for producing a solid electrolytic capacitor, including forming a dielectric layer on a surface of an anode conductor containing a valve metal, carrying out an oxidative polymerization of a monomer providing an electroconductive polymer on the dielectric layer to form a first solid electrolyte layer containing the electroconductive polymer, and carrying out an application or an impregnation of the above-mentioned electroconductive polymer solution on the first solid electrolyte layer to form a second solid electrolyte layer containing an electroconductive polymer composition obtained by removing the dispersing medium from the electroconductive polymer solution.

According to the present invention, it become possible to provide an electroconductive polymer solution in which the good dispersibility of the electroconductive polymer solution is maintained and the pH is arbitrarily adjusted, to provide an electroconductive polymer composition having an excellent heat resistance by laying the compound having a carboxylic acid amide bond and a carboxylic acid ester bond in an electroconductive polymer matrix, and also to provide a solid electrolytic capacitor having an excellent reliability and a method for producing the same.

DETAILED DESCRIPTION OF THE PREFERRED EMBODIMENTS (Electroconductive Polymer Solution)

The electroconductive polymer solution of the present invention contains an electroconductive polymer in which a dopant is doped, a first compound having an amino group and a hydroxyl group, a second compound having a carboxylic acid group, and a dispersing medium. The electroconductive polymer according to the present invention means an electroconductive polymer in which a dopant is doped to develop an electroconductivity.

As a dopant, it is possible to use an inorganic acid, an organic acid with a low molecular weight or an organic acid with a high molecular weight, or a salt thereof, or the like.

As the inorganic acid, it is possible to use, for example, a proton acid such as sulfuric acid, nitric acid, phosphoric acid, perchloric acid, tetrafluoroboric acid, or hexafluorophosphoric acid, or the like. This may be used alone, or in combination with two or more kinds.

The organic acid with a low molecular weight may be a monosulfonic acid, a disulfonic acid or a trisulfonic acid, and examples thereof include, for example, alkyl sulfonic acids, benzenesulfonic acid, naphthalenesulfonic acid, anthraquinone sulfonic acid, camphor sulfonic acid and derivatives thereof.

Examples of the derivative of the alkyl sulfonic acid include, for example, 2-acrylamide-2-methylpropanesulfonic acid and dodecylbenzenesulfonic acid.

Examples of the derivative of benzenesulfonic acid include, for example, phenolsulfonic acid, styrenesulfonic acid, toluenesulfonic acid and sulfophthalic acid.

Examples of the derivative of naphthalenesulfonic acid include, for example, 1-naphthalenesulfonic acid, 2-naphthalenesulfonic acid, 1,3-naphthalenedisulfonic acid, 1,3,6-naphthalenetrisulfonic acid and 6-ethyl-1-naphthalenesulfonic acid.

Examples of the derivative of anthraquinone sulfonic acid include, for example, anthraquinone-1-sulfonic acid, anthraquinone-2-sulfonic acid, anthraquinone-2,6-disulfonic acid and 2-methylanthraquinone-6-sulfonic acid.

Examples of the salt of the organic acid with a low molecular weight include iron (III) salts of the above-mentioned acid.

Among these, benzenesulfonic acid, naphthalenesulfonic acid or an iron (III) salt thereof is preferable. This may be used alone, or in combination with two or more kinds.

Examples of the organic acid with a high molecular weight include, for example, substituted or non-substituted polyacrylic resins such as poly(2-acrylamide-2-methylpropanesulfonic acid)s, substituted or non-substituted polyvinyl resins such as polyvinyl sulfonic acids, substituted or non-substituted polystyrene resins such as polystyrene sulfonic acids, substituted or non-substituted polyester resins such as polyester sulfonic acids, and copolymers containing one or more kind selected from these.

Examples of the salt of the organic acid with a high molecular weight include, for example, lithium salts, sodium salts, potassium salts and ammonium salts of the organic acid with a high molecular weight. Among these, a polystyrene sulfonic acid or a polyester sulfonic acid is preferable. This may be used alone, or in combination with two or more kinds.

As the electroconductive polymer, a π-conjugated electroconductive polymer can be used. Examples of the π-conjugated electroconductive polymer include polypyrroles, polythiophenes, polyanilines, polyacetylenes, poly(p-phenylene)s, poly(p-phenylene vinylene)s and poly(thienylene vinylene)s and derivatives thereof, which are substituted or non-substituted.

Examples of the substituent include hydrogen atom, hydroxyl group, carboxyl group, nitro group, phenyl group, vinyl group, halogen atoms, acyl group, amino group, sulfonic acid group, sulfonyl group, carboxylic acid ester group, sulfonic acid ester group, alkoxyl groups, alkylthio groups, arylthio groups, alkyl groups with C1 to C18 which may have a substituent thereof, cycloalkyl groups with C5 to C12 which may have a substituent thereof, aryl groups with C6 to C14 which may have a substituent thereof, and aralkyl groups with C7 to C18 which may have a substituent thereof.

Among these, the electroconductive polymer is preferably an electroconductive polymer which contains at least one kind selected from the group consisting of polypyrroles, polythiophenes and polyanilines, and derivatives thereof, and more preferably contains a repeating unit of 3,4-ethylenedioxythiophene or a derivative thereof from the viewpoint of the heat stability. The electroconductive polymer may be a homopolymer or a copolymer. Also, this electroconductive polymer may be used alone, or in combination with two or more kinds.

As the dispersing medium, it is preferable to select a dispersing medium which has a good compatibility with the electroconductive polymer, and it may be water or a water-mixed organic solvent. Specific examples of the organic solvent include polar solvents such as N-methyl-2-pyrrolidone, N,N-dimethylformamide, N,N-dimethylacetamide, dimethylsulfoxide and formamide, alcohol solvents such as methanol, ethanol and propanol, aromatic hydrocarbon solvents such as benzene, toluene and xylene, and aliphatic hydrocarbon solvents such as hexane. The organic solvent can be used alone, or in combination with two or more kinds. Among these, water or a combination of water and a polar solvent is preferable.

The content of the electroconductive polymer contained in the electroconductive polymer solution is preferably 0.1 part by mass to 30.0 parts by mass with respect to 100 parts by mass of the solvent, and is more preferably 0.5 part by mass to 20.0 parts by mass.

The method for synthesizing the electroconductive polymer according to the present invention is not particularly limited. For example, it can be synthesized by carrying out a chemical oxidative polymerization or an electropolymerization of a monomer providing an electroconductive polymer in a solution containing a dopant using an oxidant. The electroconductive polymer obtained may contain a component such as an unreacted monomer or a residual component derived from the oxidant, which is unnecessary for developing the electroconductivity. In this case, it is preferable to remove the unnecessary component by an extraction by ultrafiltration, centrifuge separation, or the like, by an ion-exchange treatment, or by a dialysis treatment. The unnecessary component contained in the electroconductive polymer can be qualified and quantified by inductively coupled high-frequency plasma (ICP) emission spectrometer, ion chromatography, UV absorption or the like.

The electroconductive polymer solution according to the present invention contains not only an electroconductive polymer and a dispersing medium, but also a first compound having an amino group and a hydroxyl group; a second compound having a carboxylic acid group.

The first compound and the second compound can provide an electroconductive polymer solution with an arbitrarily adjusted pH and provide an electroconductive polymer composition having a high strength and an excellent heat resistance. Note that, these compounds do not function as a dopant of the electroconductive polymer.

Also, the first compound and the second compound are preferably water-soluble. "Water-soluble" means a character that it can be dissolved or uniformly dispersed in water. For example, it includes a compound which is water-soluble modified by introducing a hydrophilic group into a water-insoluble compound. Examples of the hydrophilic group include hydroxyl group, sulfonic acid group and carboxylic acid group.

As the first compound having an amino group and a hydroxyl group, a water-soluble aliphatic compound can be used. The amino group is a substituent which is reacted with the second compound to form an amide bond. The hydroxyl group is a hydrophilic group, is a substituent for providing a good water-solubility, and is also reacted with the second compound to form an ester. Further, an ether may be formed.

The first compound is preferably an aminopropanediol, and examples thereof include, for example, 2-amino-2-hydroxymethyl-1,3-propanediol, 2-amino-2-hydroxyethyl-1,3-propanediol, 3-dimethylamino-1,2-propanediol, 3-methylamino-1,2-propanediol and 1-(methylamino)propanediol. This can be used alone, or in combination with two or more kinds. Among these, 2-amino-2-hydroxymethyl-1,3-propanediol is preferable.

As the second compound having a carboxylic acid group, it is possible to use water-soluble aliphatic or aromatic compounds with a low molecular weight and water-soluble polymers. Examples thereof include, for example, aliphatic or aromatic compounds with a low molecular weight and derivative thereof such as oxalic acid, malonic acid, succinic acid, fumaric acid, malic acid, adipic acid, citric acid and phthalic acid, polymers such as polyacrylic acids, polymethacrylic acids, polymaleic acids, and polyethylenes, polyesters, polyimides, polyamides, fluorine resins, polyvinyls, polystyrenes, polyurethanes, polyureas, phenol resins, polyethers and polyacryls which are water-soluble modified, and copolymers thereof. This may be used alone, or in combination with two or more kinds. Among these, phthalic acid, a polyacryl or a water-soluble modified polyester is preferable.

The weight average molecular weight of the polymer is not particularly limited, but is preferably 2000 to 700000, is more preferably 5000 to 500000, and is further preferably 10000 to 200000. The weight average molecular weight can be measured by GPC (gel permeation chromatograph). This may be used alone, or in combination with two or more kinds.

Since the first compound and the second compound have a high solubility to the electroconductive polymer solution and do not damage the dispersion state of the electroconductive polymer, the time-related stability of the electroconductive polymer solution is excellent.

The evaluation of the dispersibility of the electroconductive polymer solution after the addition of the first compound and the second compound can be carried out by particle size distribution measurement and can also be measured by centrifugal sedimentation, light transmission method, laser diffraction, dynamic light scattering, or supersonic method. Also, the pH can be measured using a pH meter generally conventionally available.

The pH of the electroconductive polymer solution of the present invention is preferably 7.0 or less not to damage the conductivity of the electroconductive polymer composition, and is preferably adjusted in consideration of the acid resistance of the substrate or the bonding material constituting the electroconductive polymer composition. Specifically, it is preferably adjusted in a range of 2.5 to 7.0, and is more preferably adjusted in a range of 3.0 to 6.5. When the pH is larger than 7.0, the electroconductivity tends to be deteriorated.

The pH can be controlled as follows. The pH of the electroconductive polymer solution is increased by mixing the first compound by the effect of the amino group. This is because an ammonium ion or an ammonium salt is formed in the solution. On the other hand, the pH of the electroconductive polymer solution is decreased by mixing the second compound by the effect of the carboxylic acid group. Thus, by controlling the mixed amounts of the first compound and the second compound, the pH can be controlled to be a desired value.

The total amount of the first compound and the second compound which are contained in the electroconductive polymer solution can be set in a range in which the electroconductivity of the electroconductive polymer is not damaged. The ratio of the electroconductive polymer and (the first compound+the second compound) is preferably 1.0:0.1 to 2.0 and is more preferably 1.0:0.1 to 1.5 in a weight ratio.

The electroconductive polymer solution is produced by mixing and dissolving a first compound and a second compound in a solution obtained by the above-mentioned method for synthesizing an electroconductive polymer. The order of mixing is not particularly limited. Also, the solution before mixing the first compound and the second compound is preferably a solution obtained by removing a remaining component derived from the oxidant used when the electroconductive polymer is synthesized.

(Electroconductive Polymer Composition)

The electroconductive polymer composition of the present invention is obtained by removing the dispersing medium by heating and dehydrating the above-mentioned electroconductive polymer solution. By the process of removing the dispersing medium, a carboxylic acid amide unit and a carboxylic acid ester unit are formed from the first compound and the second compound, and these units are laid in the electroconductive polymer matrix (or between the electroconductive polymer dispersing particles in the case in which the electroconductive polymer is in the form of the dispersed particle).

By laying these units in the electroconductive polymer composition, the strength of the electroconductive polymer composition is improved and the heat resistance is improved. For details, to lay these units results in improving the binding property between the electroconductive polymers and suppressing the deterioration of the electroconductivity by the outside stress such as a heat. The evaluation of the heat resistance is carried out, for example, by differential thermogravimetric analysis (TG/DTA).

The drying temperature for removing the dispersing medium is preferably 80° C. or higher in order to react the first compound and the second compound, and is more preferably 100° C., that is a boiling point of water, or higher. The upper limit is not particularly limited as long as it is a temperature which is equal to or lower than the decomposition temperature of the electroconductive polymer, but it is preferably 300° C. or lower from the viewpoint of preventing the deterioration of the element by heating. The drying time must appropriately be optimized by the drying temperature, but is not particularly limited as long as the electroconductive polymer is not deteriorated by the heat.

In the first compound and the second compound, when the dispersing medium is removed, amide group of the first compound is reacted with carboxylic acid group of the second compound to form a carboxylic acid amide unit, and hydroxyl group of the first compound is also reacted with carboxylic acid group of the second compound to form a carboxylic acid ester unit. The change of the organic structure can be confirmed by Fourier transform infrared spectrometry (FTIR).

As for the mixing ratio of the first compound and the second compound in the electroconductive polymer solution, in order to sufficiently form a carboxylic acid amide unit, the number of carboxylic acid group contained in the second compound is preferably set to be larger than the number of the amino group contained in the first compound. The number of carboxylic acid group contained in the second compound is set to be larger because a carboxylic acid ester unit is further formed by reacting hydroxyl group further contained in the first compound with carboxylic acid group contained in the second compound.

Specifically, the number ratio of amino group contained in the first compound and of carboxylic acid group contained in the second compound is preferably in a range of 1.0:2.0 to 5.5, and is more preferably 1.0:2.0 to 4.0. By setting it in this range, an unreacted compound is reduced as much as possible, and the strength and the heat resistance of the electroconductive polymer composition can sufficiently be improved.

(Solid Electrolytic Capacitor)

The solid electrolytic capacitor according to the present invention has a solid electrolyte containing the electroconductive polymer composition according to the present invention. By the constitution, a solid electrolytic capacitor having a low ESR and an excellent reliability such as heat resistance and wet resistance is obtained.

Specifically, a solid electrolytic capacitor having an excellent wet resistance is obtained because, as mentioned above, the strength of the electroconductive polymer composition is high and the heat resistance is excellent and because the hydrogen ion index (pH) of the electroconductive polymer solution is adjusted to prevent the corrosion of the capacitor electrode or the bonding material.

Figure 1:
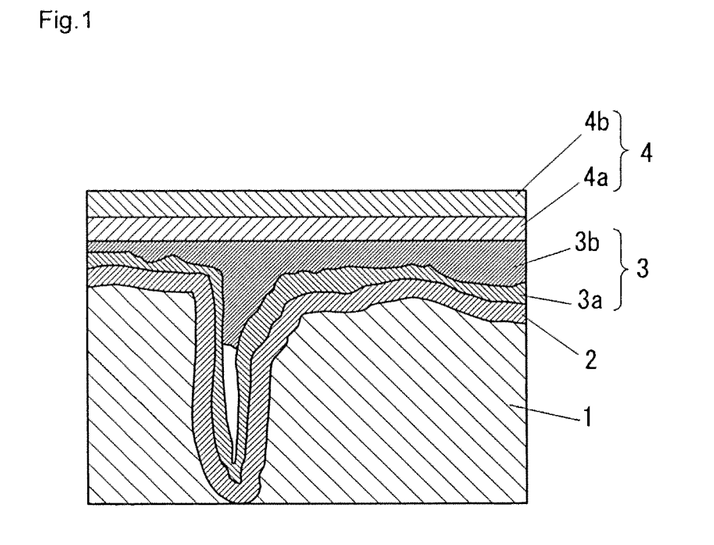
FIG. 1 is a schematic sectional view showing an example of the solid electrolytic capacitor according to the present invention.

FIG. 1 is a schematic sectional view showing an example of the solid electrolytic capacitor according to the present invention. As shown in FIG. 1, the solid electrolytic capacitor of the present embodiment has a conformation in which dielectric layer 2, solid electrolyte layer 3 and cathode conductor 4 were laminated in this order on the surface of anode conductor 1.

Anode conductor 1 is formed of: a plate, a foil or a wire of a valve metal; a sintered body containing a fine particle of a valve metal; a porous metal subjected to a surface area enlargement treatment by etching; or the like. Specific examples of the valve metal include tantalum, aluminum, titanium, niobium, zirconium, and alloys thereof. Among these, at least one kind selected from the group consisting of aluminum, tantalum and niobium is preferable.

Dielectric layer 2 is a layer which can be formed by an electrolytic oxidation of the surface of anode conductor 1, and is also formed in the pores of a sintered body or a porous body. The thickness of dielectric layer 2 can be appropriately adjusted by the voltage of the electrolytic oxidation.

Solid electrolyte layer 3 contains an electroconductive polymer composition obtained by removing the dispersing medium from at least the electroconductive polymer solution according to the present invention. Examples of the method for forming solid electrolyte layer 3 include, for example, a method in which an application or an impregnation of the electroconductive polymer solution according to the present invention on dielectric layer 2 is carried out and in which the dispersing medium of the electroconductive polymer solution is removed.

The method for the application or the impregnation of the electroconductive polymer solution is not particularly limited. In order to sufficiently fill the electroconductive polymer composition into the porous pore inside, it is preferably left for several minutes to several ten minutes after the application or the impregnation. Further, the immersion is preferably repeated, and is preferably carried out under the reduced environment or the pressurized environment.

The dispersing medium of the electroconductive polymer solution can be removed by heating and drying the electroconductive polymer solution to carry out dehydration. The drying temperature is preferably 80° C. or higher, and is more preferably 100° C., that is a boiling point of water, or higher. The upper limit of the drying temperature is not particularly limited as long as it is a temperature which is equal to or lower than the decomposition temperature of the electroconductive polymer, but it is preferably 300° C. or lower from the viewpoint of preventing the deterioration of the element by heating. Also, it is preferably determined in consideration of the heat resistance of the other materials. The drying time must appropriately be optimized by the drying temperature, but is not particularly limited as long as the electroconductivity is not deteriorated.

Solid electrolyte layer 3 may further contain an electroconductive polymer including pyrrole, thiophene, aniline or a derivative thereof; an oxide derivative such as manganese dioxide or ruthenium oxide, or an organic semiconductor such as TCNQ (7,7,8,8-tetracyanoquinodimethane complex salt).

As shown in FIG. 1, solid electrolyte layer 3 can have a two-layer structure of first solid electrolyte layer 3a and second solid electrolyte layer 3b. For example, a chemical oxidation polymerization or an electropolymerization of a monomer providing an electroconductive polymer is carried out to form first solid electrolyte layer 3a containing the electroconductive polymer on dielectric layer 2. An application or an impregnation of the electroconductive polymer solution according to the present invention is carried out on first solid electrolyte layer 3a, and the dispersing medium is removed to form second solid electrolyte layer 3b containing the electroconductive polymer composition of the present invention.

As a monomer used for forming first solid electrolyte layer 3a, at least one kind selected from the group consisting of pyrrole, thiophene, aniline and derivatives thereof can be used. As a dopant used for chemical oxidative polymerization or electropolymerization of the monomer to obtain an electroconductive polymer, sulfonic acid compounds such as alkyl sulfonic acids, benzenesulfonic acid, naphthalenesulfonic acid, anthraquinone sulfonic acid, camphor sulfonic acid and derivatives thereof are preferable. This may be used alone, or in combination with two or more kinds. The molecular weight of the dopant can appropriately be selected from low molecular weight compounds and high molecular weight compounds.

The dispersing medium may be water only or may also be a mixed solvent of water and a water-soluble organic solvent.

It is preferable that the electroconductive polymer contained in first solid electrolyte layer 3a is a polymer which has the same skeleton as that of the electroconductive polymer contained in second solid electrolyte layer 3b.

Cathode conductor 4 is not particularly limited as long as it is a conductor. For example, it can be designed to have a two-layer structure having carbon layer 4a such as graphite and silver electroconductive resin layer 4b, as shown in FIG. 1.

(Comparison with Prior Art)

When the technology content of the present invention is compared with those of JP 2006-249128 A, JP 2006-287182 A, JP 2011-82314 A and WO 2007/091656, they are similar only in the point in which that the hydrogen ion index (pH) of the electroconductive polymer solution is adjusted, but the adjusting methods are different. Also, the constitutions of the electroconductive polymer solution and the electroconductive polymer composition are also different. Of course, the effects realized are different. Specifically, there are differences in the following points.

The pH of the electroconductive polymer solution is adjusted by a method by mixing an alkali in JP 2006-249128 A and JP 2006-287182 A or an alkali, an amine, an imidazole, a pyridine or the like in JP 2011-82314 A to form a salt with the polyanion that is a dopant or to amidate or esterify the acid group of the polyanion that is a dopant. These do not contain a compound which corresponds to the second compound of the present invention.

In the electroconductive polymer composition obtained by this, the amide unit (carboxylic acid amide) and the ester unit (carboxylic acid ester) cannot be laid in an electroconductive polymer matrix as with the present invention. Thus, the effect of the present invention cannot be obtained.

In WO 2007/091656, the electroconductive polymer layer as the solid electrolyte of the capacitor contains an amide compound. In the method for producing an electroconductive polymer layer, a mixture obtained by previously mixing an amide compound with an electroconductive polymer solution is used.

On the other hand, the electroconductive polymer solution of the present invention does not contain an amide compound. Also, in the electroconductive polymer composition, a carboxylic acid amide unit and a carboxylic acid ester unit, which are newly formed in the process of removing the dispersing medium from the electroconductive polymer solution, are laid in an electroconductive polymer matrix. The constitutions of the electroconductive polymer composition are different. Thus, it is difficult to obtain effect of the present invention.

That is, it is obvious that the compound is added in the prior art as shown in JP 2006-249128 A, JP 2006-287182 A, JP 2011-82314 A and WO 2007/091656 for the purpose which is different from the focused idea and the intended function in the present invention regarding the first compound and the second compound. Thus, it is clear that they teach nothing and are not in a range in which the present invention can analogize.

EXAMPLES

As follows, the present invention is further specifically explained based on the Examples, but the present invention is not limited to these examples and includes the embodiments based on the idea of the present invention, too.

Example 1

Example 1 of the present invention is explained with reference to FIG. 1. A porous aluminum foil of 3×4 mm which was subjected to a surface area enlargement treatment by etching was used as anode conductor 1. The immersion of this anode conductor 1 to a tank containing a monomer solution, a dopant and an oxidant solution was repeated several times, and an electroconductive polymer composition containing a poly-3,4-ethylenedioxythiophene was formed on the porous body pore inside of anode conductor 1 by chemical polymerization method, to be first solid electrolyte layer 3a.

Then, 1.1 g of 3,4-ethylenedioxythiophene was served into a mixture solution of 100 g of pure water and 5.9 g of 20 mass % polystyrene sulfonic acid (weight average molecular weight: 50000), and a stirring was carried out at normal temperature for 5 minutes. After that, 5.0 g of 40 mass % ammonium persulfate aqueous solution was served at 1 ml/min, and an oxidation polymerization was carried out with a further stirring at normal temperature for 50 hours to obtain an electroconductive polymer solution in which the content of an electroconductive polymer component containing a poly-3,4-ethylenedioxythiophene and a polystyrene sulfonic acid was about 2.2 mass %. At this time, the solution color was changed from pale yellow to dark navy blue.

Then, an amphoteric ion-exchange resin (product name: MB-1, ion-exchange type: —H and —OH, produced by ORGANO CORPORATION) was served to this solution, and a stirring was carried out for 30 minutes to remove an unnecessary component derived from the oxidant. The electroconductive polymer solution obtained was dark navy blue and the pH was 2.36.

20 g of this electroconductive polymer solution was collected, and 0.69 g of formamide as a polar solvent was mixed. After that, 0.10 g of 2-amino-2-hydroxymethyl-1,3-propanediol as a first compound and 0.27 g of phthalic acid as a second compound were mixed, and a stirring for dissolution was carried out for 30 minutes. The electroconductive polymer solution obtained was dark navy blue and the pH was 3.17.

5 µl of this electroconductive polymer solution was dropped on the surface of first solid electrolyte layer 3a and was preliminarily dried at 120° C. for 10 minutes. After that, it was fully dried at 165° C. for 60 minutes to form second solid electrolyte layer 3b. Further, carbon layer 4a and silver electroconductive resin layer 4b were formed to produce a capacitor element.

Example 2

An electroconductive polymer solution was obtained in the same manner as in Example 1 except that the amount of 2-amino-2-hydroxymethyl-1,3-propanediol that was the first compound was set to be 0.20 g, and a capacitor element was produced. The electroconductive polymer solution obtained was dark navy blue and the pH was 4.68.

Example 3

An electroconductive polymer solution was obtained in the same manner as in Example 1 except that the amount of 2-amino-2-hydroxymethyl-1,3-propanediol that was the first compound was set to be 0.30 g, and a capacitor element was produced. The electroconductive polymer solution obtained was dark navy blue and the pH was 6.11.

Example 4

An electroconductive polymer solution was obtained in the same manner as in Example 1 except that the amount of 2-amino-2-hydroxymethyl-1,3-propanediol that was the first compound was set to be 0.40 g, and a capacitor element was produced. The electroconductive polymer solution obtained was dark navy blue and the pH was 7.93.

Example 5

An electroconductive polymer solution was obtained in the same manner as in Example 1 except that 2-amino-2-hydroxyethyl-1,3-propanediol was used instead of 2-amino-2-hydroxymethyl-1,3-propanediol as the first compound, and a capacitor element was produced.

Example 6

An electroconductive polymer solution was obtained in the same manner as in Example 1 except that 3-dimethylamino-1,2-propanediol was used instead of 2-amino-2-hydroxymethyl-1,3-propanediol as the first compound, and a capacitor element was produced.

Example 7

An electroconductive polymer solution was obtained in the same manner as in Example 1 except that 3-methylamino-1,2-propanediol was used instead of 2-amino-2-hydroxymethyl-1,3-propanediol as the first compound, and a capacitor element was produced.

Example 8

An electroconductive polymer solution was obtained in the same manner as in Example 1 except that 1-(methylamino)propanediol was used instead of 2-amino-2-hydroxymethyl-1,3-propanediol as the first compound, and a capacitor element was produced.

Example 9

An electroconductive polymer solution was obtained in the same manner as in Example 1 except that 0.39 g of 5-sulfoisophthalic acid was used instead of phthalic acid as the second compound, and a capacitor element was produced.

Example 10

An electroconductive polymer solution was obtained in the same manner as in Example 1 except that 1.34 g of a polyacrylic acid (25 mass % aqueous solution, molecular weight: 150000) was used instead of phthalic acid as the second compound, and a capacitor element was produced.

Comparative Example 1

An electroconductive polymer solution was obtained in the same manner as in Example 1 except that 2-amino-2-hydroxymethyl-1,3-propanediol that was the first compound and phthalic acid that was the second compound were not mixed, and a capacitor element was produced.

Comparative Example 2

An electroconductive polymer solution was obtained in the same manner as in Example 1 except that 0.10 g of 2-amino-2-hydroxymethyl-1,3-propanediol was mixed as the first compound and that the second compound was not mixed, and a capacitor element was produced. The electroconductive polymer solution obtained was dark navy blue and the pH was 9.21.

(Evaluation of Capacitor Element)

The initial ESRs of the capacitor elements of the above-mentioned Examples and Comparative Examples at 100 kHz were measured. After that, as the evaluations of the heat resistance property and wet resistance property, a heat resistance test and a wet resistance test were carried out to calculate the ESR changing ratio (=ESR after the test/initial ESR before the test). Note that, the condition of the heat resistance test was to leave it under an atmosphere at 125° C. with no load for 500 hours, and the condition of the wet resistance test was to leave it under an atmosphere at 65° C. and 95% R.H. with no load for 500 hours. The evaluation numbers were each set to be 10, and the evaluations were carried out with the average of 10 values. The evaluation results are shown in TABLE 1.

TABLE 1

| | | ESR Changing Ratio | |
|---|---|---|---|
| | Initial ESR (mΩ) | Heat Resistance Property | Wet Resistance Property |
| Example 1 | 7.4 | 1.5 | 1.7 |
| Example 2 | 7.7 | 1.7 | 1.6 |
| Example 3 | 8.1 | 1.7 | 1.6 |
| Example 4 | 14.2 | 2.1 | 1.8 |
| Example 5 | 7.6 | 1.6 | 1.8 |
| Example 6 | 7.7 | 1.7 | 1.8 |
| Example 7 | 7.9 | 1.7 | 1.7 |
| Example 8 | 7.8 | 1.8 | 1.9 |
| Example 9 | 7.9 | 1.5 | 1.9 |
| Example 10 | 8.3 | 1.8 | 1.7 |
| Comparative Example 1 | 7.5 | 4.6 | 4.9 |
| Comparative Example 2 | 17.1 | 4.7 | 2.7 |

As shown in TABLE 1, the ESR changing ratios after the heat resistance test and the wet resistance test in Examples 1 to 10 were largely reduced in comparison with those in Comparative Examples 1 and 2, and the reliabilities were improved. The improvement of the heat resistance of the capacitor element is thought to be caused by improving the strength of the electroconductive polymer composition by the constitution of the present invention. The improvement of the wet resistance is thought to be caused not only by the above-mentioned matter but also by adjusting and reducing the pH of the electroconductive polymer solution to suppress the corrosion of the aluminum foil as the electrode that is the anode conductor of the capacitor element.

(Evaluation of Electroconductive Polymer Composition)

The evaluations of the physical property and the heat resistance of the electroconductive polymer composition as well as the organic structure analysis were carried out as follows.

Example 11

The electroconductive polymer solution of Example 1 was dropped on a glass slide, and was preliminarily dried at 120° C. for 5 minutes and was then fully dried at 165° C. for 60 minutes to obtain the electroconductive polymer composition. Then, this electroconductive polymer composition was scraped using a spatula from the glass slide. The electroconductive polymer composition of Example 11 was lusterless, soft and adhesive to the glass.

Example 12

An electroconductive polymer composition was obtained in the same manner as in Example 11 except that the electroconductive polymer solution in Example 3 was used. The electroconductive polymer composition of Example 12 was lustrous, clayey and highly adhesive to the glass slide.

Comparative Example 3

An electroconductive polymer composition was obtained in the same manner as in Example 11 except that the electroconductive polymer solution in Comparative Example 1 was used. The electroconductive polymer composition of Comparative Example 3 was lusterless. Since it was hard, it broke apart when scraped from the glass slide. Also, it was not adhesive to the glass slide.

Figure 2:
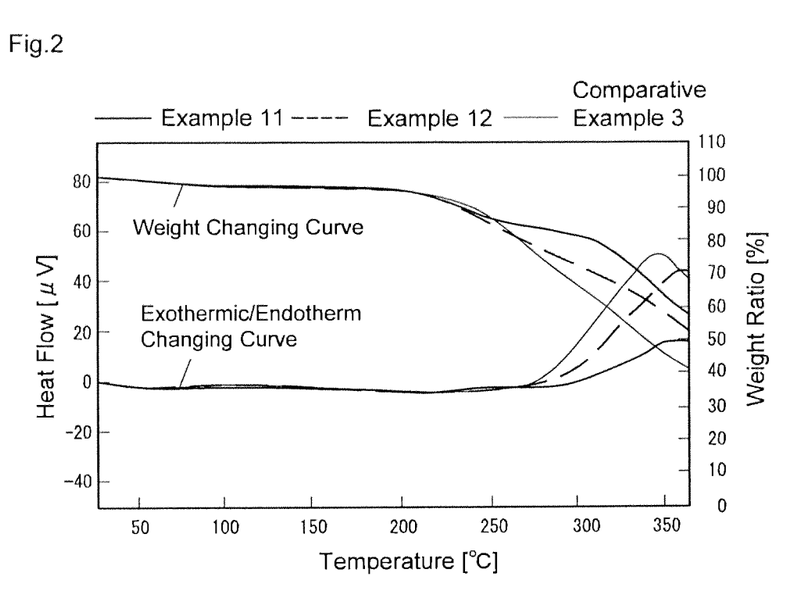
FIG. 2 is a chart showing the results of the heat resistance evaluation of the electroconductive polymer composition.

In Examples 11 and 12, and Comparative Example 3, the differential thermogravimetric analysis (TG/DTA) of the electroconductive polymer composition scraped from the glass slide was carried out as an evaluation of the heat resistance. The condition was under an atmosphere at a temperature increase of 10° C./minute. FIG. 2 is a chart showing the results of the heat resistance evaluation of the electroconductive polymer composition.

As shown in FIG. 2, the weight losses at around 250° C. or more in Examples 11 and 12 were small in comparison with that of Comparative Example 3, and the heat resistance was improved. Also, it was confirmed that the physical properties (strength and adhesiveness) of the electroconductive polymer composition obtained was changed. That is, since the electroconductive polymer compositions of Examples 11 and 12 are soft and clayey as well as adhesive to the glass slide, the strength and the adhesiveness to the substrate is presumed to be high. Since the electroconductive polymer composition of Comparative Example 3 breaks apart from the glass slide and is thus brittle, and further is not adhesive to the glass slide, the strength and the adhesiveness to the substrate is thought to be low.

As mentioned above, it has become clear that the electroconductive polymer composition obtained which contains a first compound and a second compound in an electroconductive polymer solution has different physical properties and an excellent heat resistance.

Example 13

0.16 g (1.33×10³ mol) of 2-amino-2-hydroxymethyl-1,3-propanediol as the first compound and 0.41 g (2.48×10³ mol)

of phthalic acid as the second compound were mixed to 20 g of water to produce a solution which did not contain an electroconductive polymer. This solution was dropped on a glass slide, and was preliminarily dried at 120° C. for 5 minutes and was then fully dried at 165° C. for 60 minutes for the production. A transparent solid was obtained on the glass slide.

Figure 3:
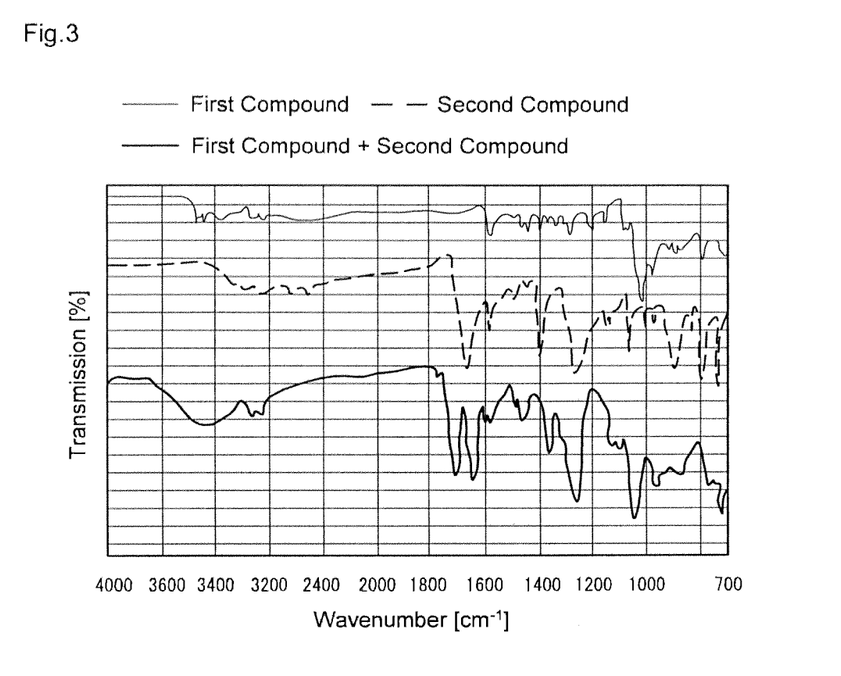
FIG. 3 is a chart showing the results of the organic structure analysis of the compound formed from the first compound and the second compound.

The organic structure analysis by FTIR of the obtained transparent solid was carried out. FIG. 3 is a chart showing the results of the organic structure analysis of the compound formed from the first compound and the second compound. In this case, the first compound was 2-amino-2-hydroxymethyl-1,3-propanediol, the second compound was phthalic acid, and the compound formed from the first compound and the second compound (first compound+second compound) was the solid.

As shown in FIG. 3, the spectrum of the compound formed from the first compound and the second compound (first compound+second compound) showed a different behavior from that of each of the first compound and the second compound. It was confirmed that the spectrum presumed to be carboxylic acid amide and carboxylic acid ester was newly formed and that the organic structure was changed.

Then, the transparent solid obtained was scraped using a spatula from the glass slide, and the differential thermogravimetric analysis (TG/DTA) was carried out. The condition was under an atmosphere at a temperature increase of 10° C./minute. This transparent solid was soft and clayey as well as strongly adhesive to the glass.

Figure 4:
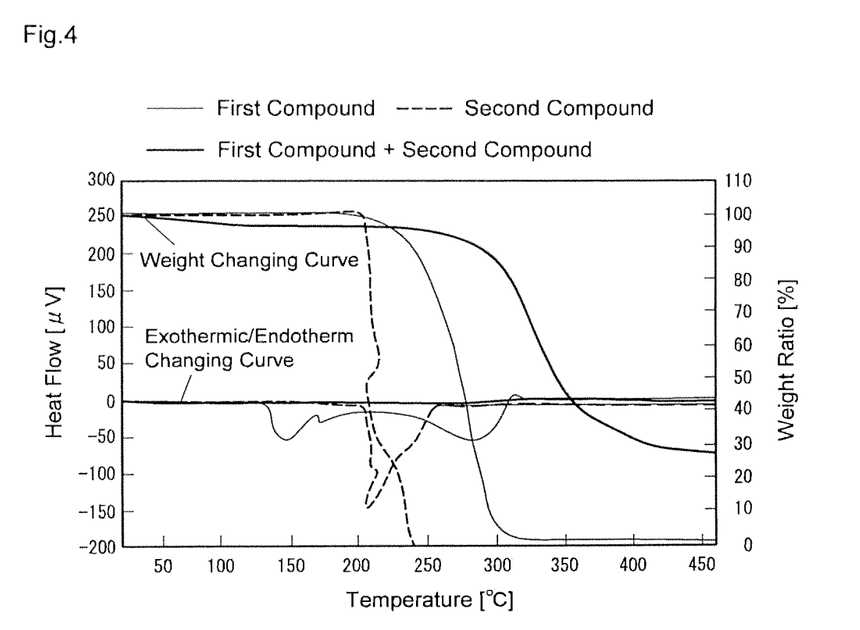
FIG. 4 is a chart showing the results of the heat resistance evaluation of the compound formed from the first compound and the second compound.

FIG. 4 is a chart showing the results of the heat resistance evaluation of the compound formed from the first compound and the second compound contained in the electroconductive polymer solution. In this case, the first compound was 2-amino-2-hydroxymethyl-1,3-propanediol, the second compound was phthalic acid, and the compound formed from the first compound and the second compound (first compound+second compound) was the solid.

As shown in FIG. 4, the TG/DTA curve of the compound formed from the first compound and the second compound (first compound+second compound) had no peak of the endothermic reaction which was derived from the first compound and the second compound, and the weight loss at around 200° C. or more was also small. It was confirmed that a new compound having a high heat resistance was formed.

That is, it has become clear that a compound having a new organic structure and an excellent heat resistance is formed by mixing a first compound and a second compound.

Here, when FIG. 2 is compared with FIG. 4, the TG/DTA curves of Examples 11 and 12 in FIG. 2 are similar to that of (first compound+second compound) in FIG. 4, and the physical properties of the electroconductive polymer compositions obtained is also similar. In other words, it can be said that the character and the heat resistance of the electroconductive polymer composition are improved because the first compound and the second compound are similarly reacted also in the solution containing an electroconductive polymer to form a carboxylic acid amide and carboxylic acid ester unit which is laid in an electroconductive polymer matrix.

It has become clear that the electroconductive polymer solution of the present invention contains a first compound having an amino group and a hydroxyl group and a second compound having a carboxylic acid group in which the hydrogen ion index (pH) can be arbitrarily adjusted, and that the electroconductive polymer composition obtained by removing the dispersing medium is an electroconductive polymer composition which has a high strength, a strong adhesiveness to a substrate, and an excellent heat resistance.

Also, due to these, it has become clear that the capacitor containing the electroconductive polymer composition of the present invention as a solid electrolyte has an excellent reliability.

The present invention is utilized for electrodes and solid electrolytic capacitors of electronic devices such as solar cells, organic electroluminescence displays and touch panels.

What is claimed is:

1. An electroconductive polymer solution, comprising:
    an electroconductive polymer in which a dopant is doped;
    a first compound having an amino group and a hydroxyl group;
    a second compound having a carboxylic acid group; and
    a dispersing medium,
    wherein the first compound is at least one kind selected from 2-amino-2-hydroxymethyl-1,3-propanediol, 2-amino-2-hydroxyethyl-1,3-propanediol, 3-methylamino-1,2-propanediol and 1-(methylamino)propanediol.

2. The electroconductive polymer solution according to claim 1, wherein the second compound is a water-soluble compound with a low molecular weight.

3. The electroconductive polymer solution according to claim 1, wherein the second compound is a water-soluble polymer.

4. The electroconductive polymer solution according to claim 1, wherein the number ratio of the amino group comprised in the first compound and of the carboxylic acid group comprised in the second compound is in a range of 1.0:2.0 to 5.5.

5. The electroconductive polymer solution according to claim 1, wherein the electroconductive polymer comprises at least one kind selected from the group consisting of polypyrroles, polythiophenes, polyanilines and derivatives thereof.

6. The electroconductive polymer solution according to claim 1, wherein the electroconductive polymer comprises a repeating unit of 3,4-ethylenedioxythiophene or a derivative thereof.

7. The electroconductive polymer solution according to claim 1, having a pH of 2.5 to 7.0.

8. An electroconductive polymer composition, comprising the electroconductive polymer and a compound having a carboxylic acid amide bond and a carboxylic acid ester bond which is formed from the first compound and the second compound by removing the dispersing medium from the electroconductive polymer solution according to claim 1.

9. The electroconductive polymer composition according to claim 8, obtained by heating the electroconductive polymer solution at 80° C. or higher and 300° C. or lower to remove the dispersing medium.

10. A solid electrolytic capacitor, having a solid electrolyte comprising the electroconductive polymer composition according to claim 8.

11. A method for producing a solid electrolytic capacitor, comprising:
    forming a dielectric layer on a surface of an anode conductor comprising a valve metal; and
    carrying out an application or an impregnation of the electroconductive polymer solution according to claim 1 on the dielectric layer to form a solid electrolyte layer comprising an electroconductive polymer composition obtained by removing the dispersing medium from the electroconductive polymer solution.

12. A method for producing a solid electrolytic capacitor, comprising:
    forming a dielectric layer on a surface of an anode conductor comprising a valve metal;

carrying out an oxidative polymerization of a monomer providing an electroconductive polymer on the dielectric layer to form a first solid electrolyte layer containing the electroconductive polymer; and carrying out an application or an impregnation of the electroconductive polymer solution according to claim 1 on the first solid electrolyte layer to form a second solid electrolyte layer comprising an electroconductive polymer composition obtained by removing the dispersing medium from the electroconductive polymer solution.

13. An electroconductive polymer composition, obtained by forming a compound having a carboxylic acid amide bond and a carboxylic acid ester bond from a first compound having an amino group and a hydroxyl group and a second compound having a carboxylic acid group, wherein the compound having a carboxylic acid amide bond and a carboxylic acid ester bond is laid in an electroconductive polymer matrix or between electroconductive polymer dispersing particles, wherein the first compound is at least one kind selected from 2-amino-2-hydroxymethyl-1,3-propanediol, 2-amino-2-hydroxyethyl-1,3-propanediol, 3-methylamino-1,2-propanediol and 1-(methylamino)propanediol.

* * * * *